(12) United States Patent
Stephen et al.

(10) Patent No.: US 6,354,548 B1
(45) Date of Patent: Mar. 12, 2002

(54) DROPPING SIDE SHELF ASSEMBLY

(75) Inventors: Robert T. Stephen; Erich J. Schlosser, both of Barrington; J. Michael Alden; Ewald Sieg, both of Palatine; Mark Johnson, Wilmette, all of IL (US)

(73) Assignee: Weber-Stephen Products Company, Palatine, IL (US)

( * ) Notice: Subject to any disclaimer, the term of this patent is extended or adjusted under 35 U.S.C. 154(b) by 0 days.

(21) Appl. No.: 09/374,821

(22) Filed: Aug. 13, 1999

(51) Int. Cl.⁷ .............................................. A47G 29/02
(52) U.S. Cl. .................................... 248/240.4; 248/240
(58) Field of Search .............................. 248/240, 240.3, 248/240.4, 235, 292.14, 292.12, 291.1, 299.1; 126/41 R, 9 B; 99/449; 108/137

(56) References Cited

U.S. PATENT DOCUMENTS

| | | | |
|---|---|---|---|
| 648,860 A | * 5/1900 | Doyle | 248/240.4 |
| 2,541,528 A | 2/1951 | McAvoy | |
| 2,679,992 A | * 6/1954 | Schuette | 108/137 |
| 4,677,964 A | 7/1987 | Lohmeyer et al. | 126/41 R |
| 4,688,541 A | 8/1987 | Stephen et al. | 126/25 R |
| D298,406 S | 11/1988 | Stephen et al. | D7/402 |
| 4,886,045 A | 12/1989 | Ducate, Jr. et al. | 126/41 R |
| 5,016,607 A | 5/1991 | Doolittle et al. | 126/25 R |
| 5,076,256 A | 12/1991 | Raymer et al. | 126/41 R |
| 5,076,257 A | 12/1991 | Raymer et al. | 126/41 R |
| 5,090,398 A | 2/1992 | Raymer et al. | 126/41 R |
| 5,220,764 A | 6/1993 | James | 52/473 |
| 5,277,106 A | 1/1994 | Raymer et al. | 99/447 |
| 5,873,355 A | 2/1999 | Schlosser et al. | 12/41 R |
| 5,941,229 A | 8/1999 | Schlosser et al. | 126/41 |
| 5,992,654 A | * 11/1999 | Dente, Jr. | 211/90.01 |

FOREIGN PATENT DOCUMENTS

| EP | 0 903 101 | 3/1999 |
|---|---|---|

\* cited by examiner

*Primary Examiner*—Anita King
*Assistant Examiner*—Gwendolyn Baxter
(74) *Attorney, Agent, or Firm*—Wallenstein & Wagner, Ltd.

(57) ABSTRACT

The present invention provides a shelf assembly for a cooking apparatus such as a barbeque grill, and method of using same. The shelf assembly has a shelf component which can rotate about a generally horizontal axis of rotation located generally at a first end of the shelf component, from a lowered position to a raised position. The cooking apparatus or an associated apparatus has a frame member which supports the first end of the shelf component about the axis of rotation. The shelf assembly also has a support extending downwardly in relation to the shelf component when the shelf component is in the raised position. The support is capable of rotating about the axis of rotation with the shelf component. The shelf assembly further has a stationary coupler located generally below the axis of rotation in the vicinity of where the support is capable of rotating about the axis of rotation with the shelf component. The support can releasably engage with the stationary coupler when the shelf component is in the lowered position to generally prevent the shelf component from inadvertently swinging outwardly from the lowered position. The support also supportingly engages with the stationary coupler to support the support and the shelf component when the shelf component is in the raised position.

34 Claims, 8 Drawing Sheets

DROPPING SIDE SHELF ASSEMBLY

TECHNICAL BACKGROUND

This invention relates to an auxiliary shelf for a cooking apparatus such as a barbeque grill. In particular, this invention relates to a shelf for a barbecue grill assembly, which extends from the side of barbecue grill assembly, and has a raised position and a lowered position.

BACKGROUND OF THE INVENTION

Gas grills continue to be very popular as outdoor portable cooking devices. As disclosed in U.S. Pat. No. 4,677,964, to Lohmeyer et al., portable gas grills usually consist of a cart that is supported on wheels and has a cooking vessel thereon. The vessel usually consists of gas burners in the lower portion of the vessel, with various known elements therein. Next to the vessel, the grill can have a working surface, as shown in FIG. 1 of the Lohmeyer reference, disclosed as a working board 170 that is supported on the side members 40 by brackets 171 (FIG. 14 therein). At times, a user of such grills may need additional work space. As such, this reference also discloses that a further working board 172 can also be provided which is moveable between a stored position and a useable position, as shown in FIGS. 1 and 3 therein. This reference further discloses that the working board is connected along one edge by a hinge 173 to the side member 40, and is supported in the useable position, extending generally horizontally as shown in FIG. 1, by a support rod. The support rod 174 is pivotally supported on the lower surface of the board 172 and has an offset outer free end received around the leg 36.

U.S. Pat. No. 5,452,707 to Harris et al., also discloses a working type surface from a series of slats 64 that are secured over and extending between front and rear rails 60 and 62, to form shelves. The rails are connected to the legs through the engagement of a pair of elongated upper and lower slots 66 and 68, respectively, with a pair of corresponding upper and lower pins 70 and 72. The upper slots have an open guideway 73 into the upper slot while the lower slot is closed, capturing the pin therein. The shelves have a raised, horizontal position, and a lowered, vertical position. To place a shelve in the raised position, the upper pin is directed into the guideway 73 by the curved camming portion 74 at the entrance to the guideway. When the shelve is fully raised, its weight causes it to drop into a locked position with the pins engaging the uppermost portions of the slots.

Figures 1, 2, 3:
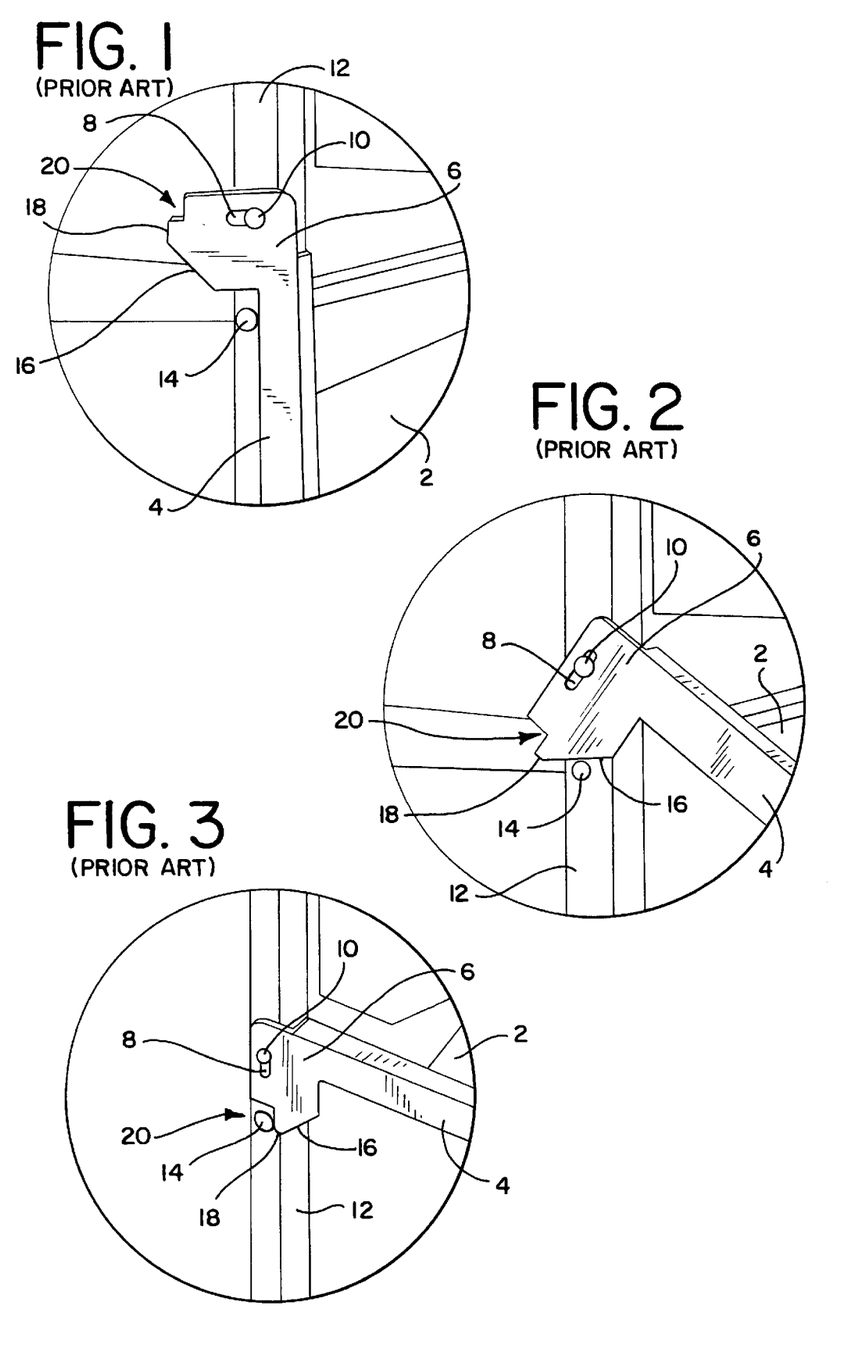
FIG. 1 is a cut away perspective view of a prior art shelf assembly having the shelf component in a lowered position.
FIG. 2 is a cut away perspective view of the prior art shelf assembly of FIG. 1, having the shelf component being raised toward the raised position.
FIG. 3 is a cut away perspective view of the prior art shelf assembly of FIG. 1, having the shelf component in the raised position.

FIGS. 1, 2, and 3, of the present specification, additionally show a known apparatus which is a part of a shelf assembly having a shelf component 2 (partly shown) which rests on a first and second rails 4, (not shown). Extending from the first rail is an engagement region 6 having a slot 8 for accepting a first pin 10. The first pin 10 projects laterally from the frame 12, and a second pin 14 also extends laterally from the frame 12, below the first pin 10. When the shelf component 2 is raised from a lowered, vertical position, shown in FIG. 1, to a raised, horizontal position, shown in FIG. 3, an engagement edge 16 engages the second pin 14 and causes the first pin 10 in the slot 8 to move from one end of the slot to the other end of the slot. The second pin 14 then comes into contact with an engagement point 18 of the engagement region 6, which causes the shelf component 2 to be placed in its highest substantially horizontal position before moving into the raised position. The engagement point 18 then moves past the second pin 14, and the engagement region 6, and shelf component 2 drop into the raised position. The second pin 14 is then engaged with a notch 20 cutout in the engagement region 6 to hold the shelf component in the raised position.

The present invention is provided to simplify and improve upon the above and other devices, as well as to solve the problems with such devices.

SUMMARY OF THE INVENTION

The present invention provides a shelf assembly for a cooking apparatus such as a barbeque grill. The shelf assembly has a shelf component which can rotate about a generally horizontal axis of rotation located generally at a first end of the shelf component, from a lowered position to a raised position. The cooking apparatus or an associated apparatus, has a frame with a plurality of frame members. At least one of the frame members supports the first end of the shelf component about the axis of rotation. The shelf assembly can utilize a rod aligned with the axis of rotation, for connecting the shelf component with the frame member, and for supporting the first end of the shelf component about the rod, wherein the shelf component rotates about the rod.

The shelf assembly also has a support extending downwardly in relation to the shelf component when the shelf component is in the raised position. The support is capable of rotating about the axis of rotation with the shelf component. The shelf assembly further has a stationary coupler located generally below the axis of rotation in the vicinity of where the support is capable of rotating about the axis of rotation with the shelf component. The stationary coupler can be mounted on the frame member. The support can releasably engage with the stationary coupler when the shelf component is in the lowered position to generally prevent the shelf component from inadvertently swinging outwardly from the lowered position. The support also supportingly engages with the stationary coupler to support the support and the shelf component when the shelf component is in the raised position.

The stationary coupler or the support can have a recess for releasably engaging with the support or stationary coupler, respectively, when the shelf component is in the lowered position to generally prevent the shelf component from inadvertently swinging outwardly from the lowered position. The stationary coupler or the support can have a projection for engaging with the recess that may be in either the support or the stationary coupler, respectively, when the shelf component is in the lowered position to generally prevent the shelf component from inadvertently swinging outwardly from the lowered position. The stationary coupler further has an engagement surface for engaging the support and for supporting the shelf component when the shelf component is in the raised position.

The shelf component can also laterally slide along the axis of rotation from a first lateral position to a second lateral position, when the shelf component is raised above the raised position, in order to place the shelf component in the raised position. The stationary coupler can also have one or more fingers for preventing the shelf component from being inadvertently removed from the raised position when the shelf component is in the raised position.

The shelf component of the shelf assembly, has an upper surface and a lower surface generally parallel with the upper surface. The shelf component can have one or more ribs extending substantially across the lower surface of the shelf component to increase the rigidity of the shelf component. When the support is engaged with the stationary coupler, a gravitational force is transferred from the upper surface of the shelf component through the plurality of ribs, to the support and to the stationary coupler, to support objects placed on the upper surface of the shelf component. The ribs can extend from a position adjacent the support to a position generally across a central region of the lower surface of the shelf component, can be parallel, can be crossed or not crossed.

The present invention further provides a method of placing the shelf assembly in a raised position from a lowered position. The method includes rotating the shelf component about the axis of rotation from the lowered position in a direction toward the raised position. The method further includes raising the shelf component above the raised position in order to clear a blocking component. The method also includes sliding the shelf component laterally along the axis of rotation from a first lateral position to a second lateral position, and lowering the shelf component into the raised position.

Other features and advantages of the present invention will become apparent with reference to the following description and accompanying Figures.

DETAILED DESCRIPTION

While the invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As described above, FIGS. 1, 2, and 3 show a portion of a prior art shelf assembly from which the structure and operation thereof can be understood.

Figure 4:
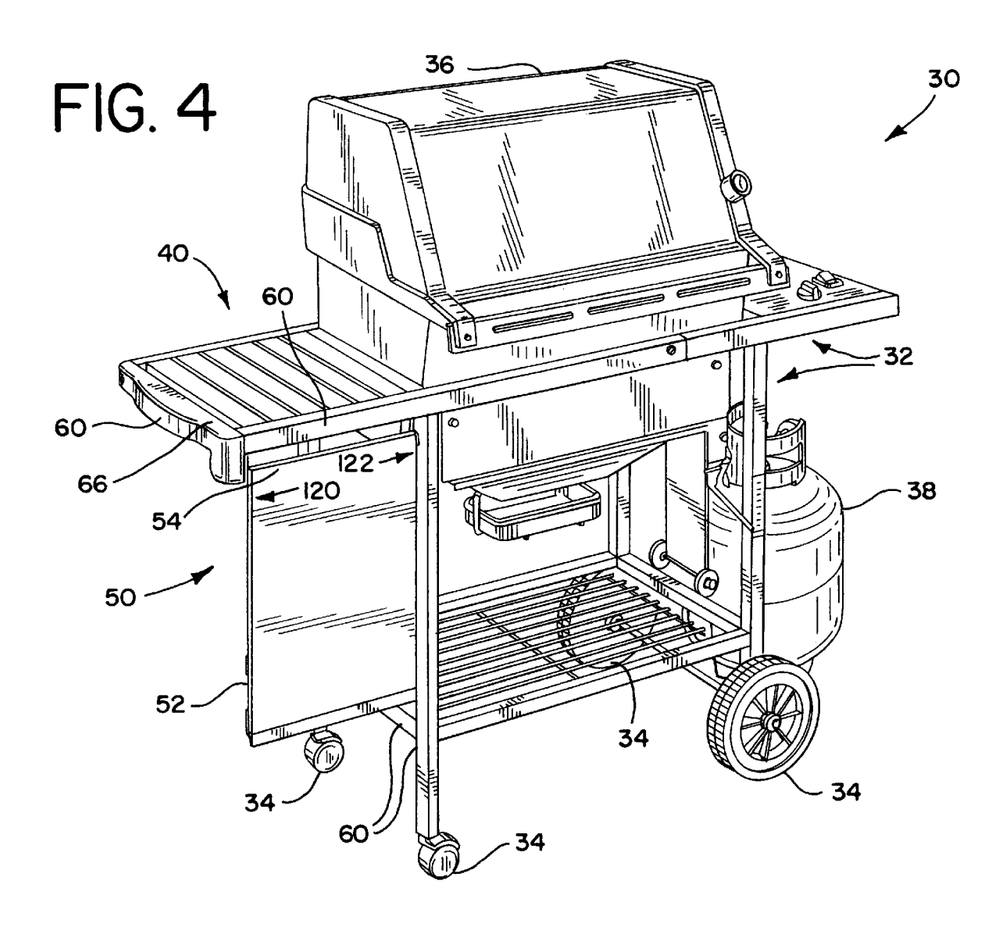
FIG. 4 is a perspective view of a barbeque grill cooking apparatus including one embodiment of the shelf assembly of the present invention.

FIG. 4 shows one embodiment of the present invention in the form of a barbeque grill cooking apparatus 30 having a cart 32 that is supported on wheels and casters 34 and having a cooking vessel 36 on the cart. The vessel 36 usually consists of gas burners (not shown) in the lower portion of the vessel 36, with various known elements therein. A gas tank 38 is also shown for providing gas to the gas burners within the vessel 36. Next to the vessel 36, the cooking apparatus can have a stationary working surface 40 for use with the cooking of food products.

FIG. 4 also shows one embodiment of a shelf assembly 50 of the present invention. As partially shown in FIG. 5, but in more detail, this embodiment of the shelf assembly 50 includes a shelf component 52 having a first end 54. The shelf component 52 in FIGS. 4 and 5 can rotate about a generally horizontal axis of rotation 56 located generally at the first end 54 of the shelf component 52. As will be described in greater detail below, the shelf component 52 is capable of rotating about the axis of rotation 56 from a lowered position to a raised position.

Figure 5:
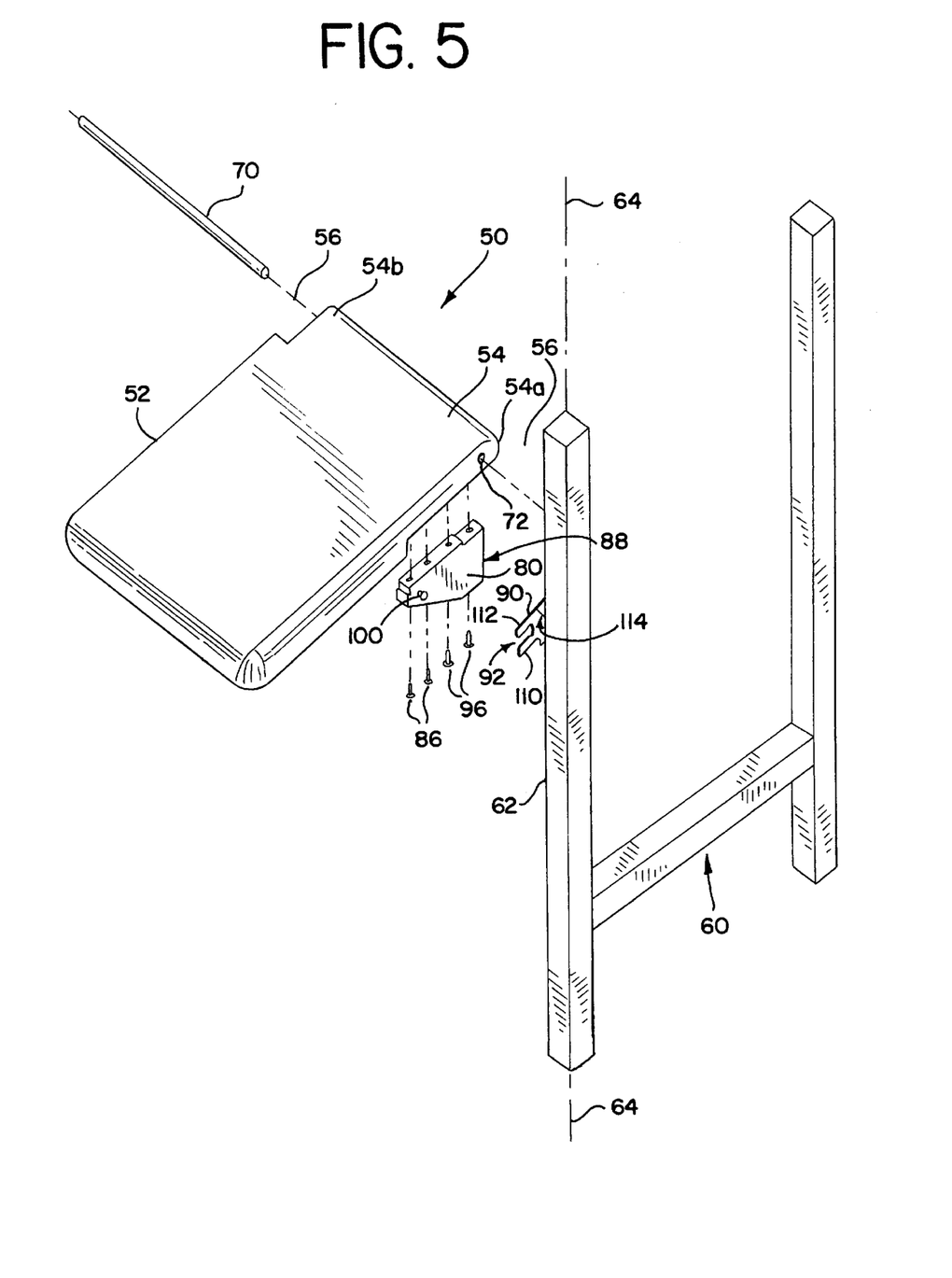
FIG. 5 is an exploded perspective view of one embodiment of the shelf assembly of the present invention.
Figure 6:
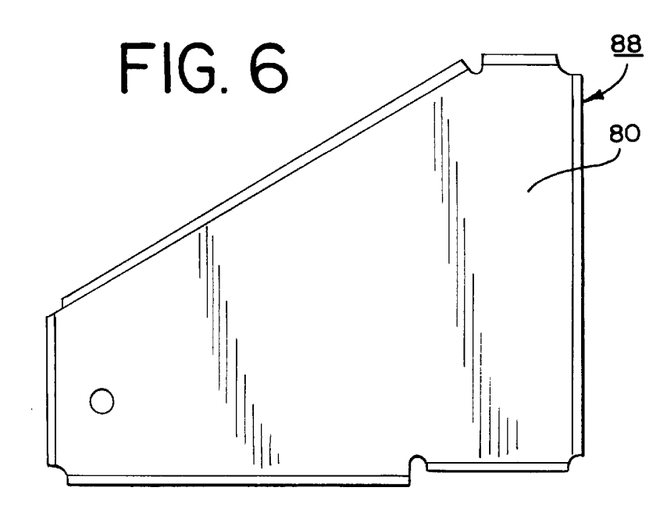
FIG. 6 is a front view of one support of the embodiment of the shelf assembly shown in FIG. 5.

FIG. 4 shows several portions of a frame 60, and FIG. 5 shows a portion of the frame 60. In particular, FIG. 5 shows a vertical frame member 62 along a vertical axis 64 which is generally perpendicular to the axis of rotation 56. The vertical frame member can be used for supporting the first end 54 of the shelf component 52 about the axis of rotation 56. As shown in the embodiment in FIGS. 4 and 5, a rod 70 can be used in conjunction with the vertical frame member 62 (shown as a leg) and an arm 66 of the frame 60. The leg 62, arm 66, and shelf component 52 have a set of holes 72 (see FIGS. 10, 12, and 14–17) for accepting the rod 70. These elements work together to support a first side 54a and a second side 54b of the first end 54 of the shelf component 52, and about the axis of rotation 56. The rod 70 is aligned with the axis of rotation 56. Thus, the shelf component 52 rotates about the rod 70, and the rod 70 connects with the frame member 62 for supporting the first end 54 of the shelf component 52 about the rod 70, as shown in FIG. 5.

Figure 17:
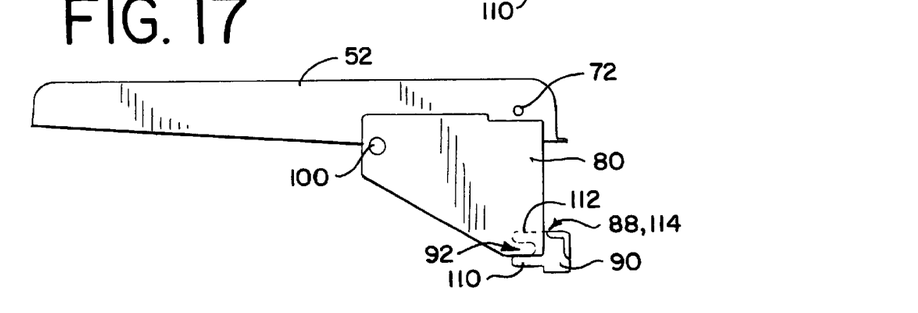
FIG. 17 is a side view of a part of the embodiment of the shelf assembly shown in FIG. 5, with the shelf component in the raised position.
Figure 20:
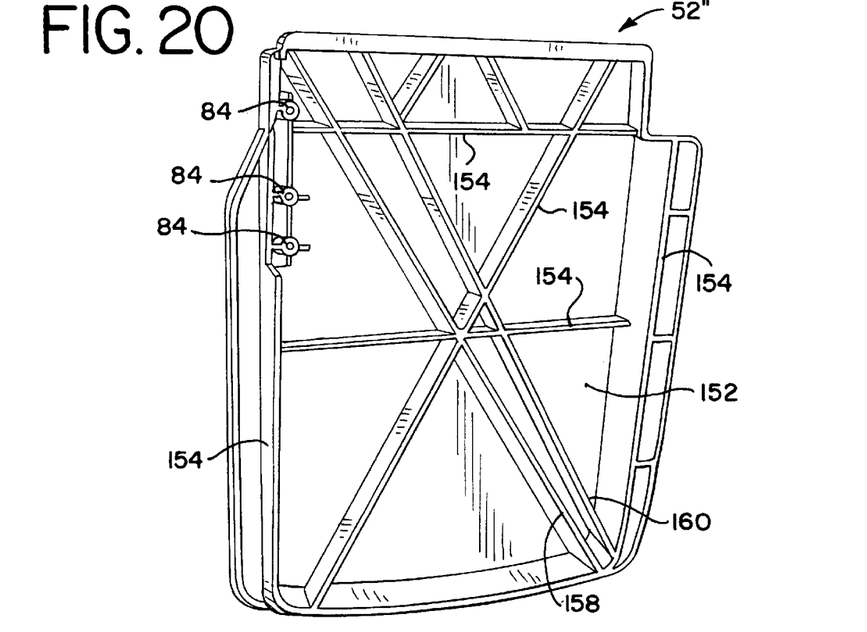
FIG. 20 is a bottom view of an alternative embodiment of the shelf component of the present invention; and, FIG. 21 is a bottom view of a further alternative embodiment of the shelf component of the present invention.
Figure 21:
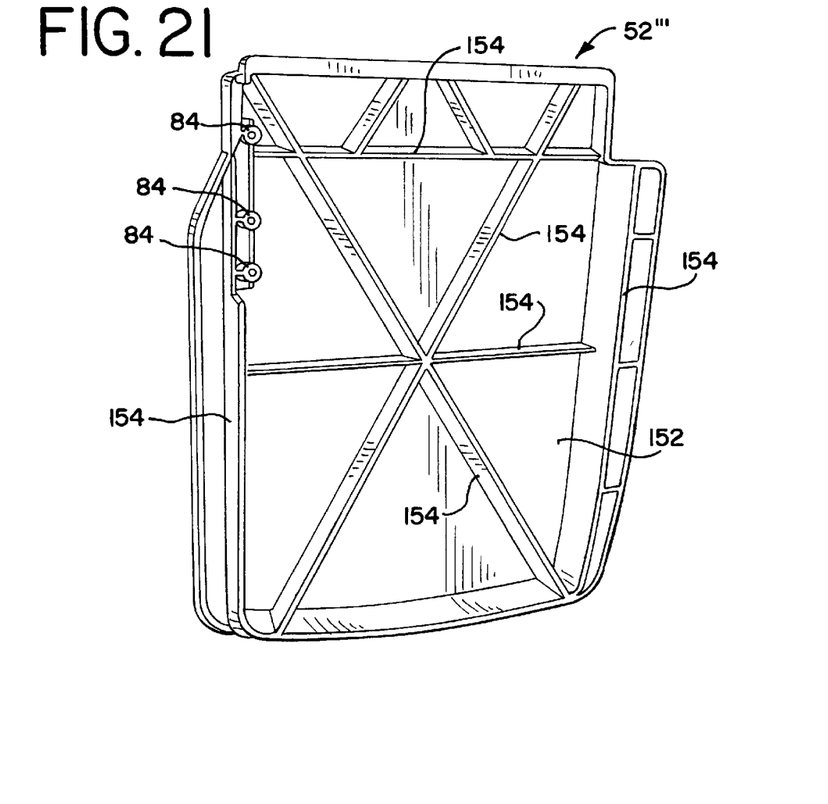

The embodiment of the shelf assembly 50 shown in FIG. 5 also has a support 80 extending downwardly in relation to the shelf component 52 when the shelf component 52 is in the raised position (see FIG. 17). The support 80 extends from the shelf 52 to provide an edge surface 88 that is generally perpendicular to the shelf 52. Further, the support is entirely free from the barbecue grill frame members, and secured solely to the shelf 52 and pivotal about the shelf axis of rotation 56. As shown in FIGS. 6 through 9, the support 80 has a plurality of screw holes 82 for accepting screws 86, which are screwed into threaded bores 84 (see FIGS. 18, 20, and 21). When the support 80 is attached to the shelf component 52, the support 80 will rotate about the axis of rotation 56 with the shelf component 52.

The embodiment of the shelf assembly 50 shown in FIG. 5 further has a stationary coupler 90 located generally below the axis of rotation 56 in the vicinity of where the support 80 is capable of rotating about the axis of rotation 56 with the shelf component 52. The support 80 releasably engages with the stationary coupler 90 when the shelf component 52 is in the lowered position (see FIG. 14) to generally prevent the shelf component from inadvertently swinging outwardly from the lowered position. In particular, the support 80 in the embodiment in FIG. 5 has a projection 100, for releaseably engaging with a recess 92 in the stationary coupler 90 when the shelf component 52 is in the lowered position (see FIG. 14) to generally prevent the shelf component 52 from inadvertently swinging outwardly from the lowered position. The projection 100 and recess 92 can each be considered as an engagement member for the purposes of the present invention.

Figure 11:
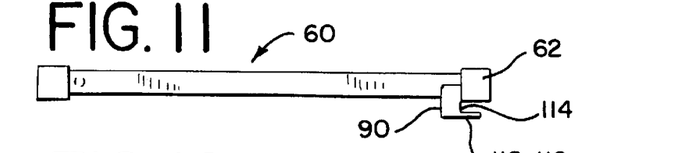
FIG. 11 is a top view of the portion of the frame shown in FIG. 10.
Figure 12:
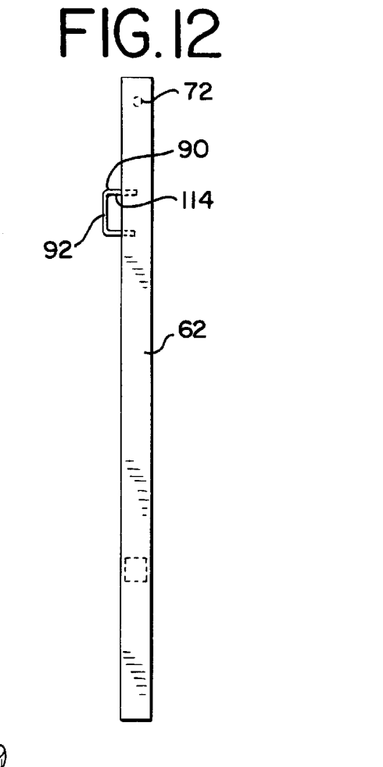
FIG. 12 is a right side view of the portion of the frame shown in FIG. 10.

When the shelf component 52 is in the raised position (see FIG. 17), the support 80 supportingly engages with the stationary coupler 90 to support the support 80 and the shelf component 52. In the embodiment shown in FIG. 5 (see also FIGS. 10–12), the stationary coupler 90 is mounted on the vertical frame member 62. The present invention, therefore, provides removable locking assembly for positioning the shelf 52 from a non-use lower position to a use raised position by securement between an extending surface 88 perpendicular to the shelf with an engagement surface 114 in fixed relation integral with the grill frame. Further, the present invention provides a support member for the dropping shelf that supports the shelf from a single corner of the shelf adjacent the barbecue grill frame.

As indicated above, the stationary coupler 90 of the embodiment in FIGS. 5, 10, 11, and 12 has a recess 92. This recess 92 has an entrance region 94 and a central region 96 adjacent to the entrance region 94. The central region 96 has a central width CW. The recess 92 further has an engagement region 98 adjacent to the central region 96. The engagement region 98 has an engagement width EW that is wider than the central width CW, which is comparable to a diameter (for a circular engagement region 98).

The stationary coupler 90 of the embodiment in FIGS. 5, 10, 11, and 12 also has a first projection 110 facing generally in a direction of outward movement of the shelf component 52 when the shelf component 52 moves from the lowered position (see FIG. 14) to the raised position (see FIG. 17). The stationary coupler 90 also has a second projection 112 also facing generally in the direction of the outward movement of the shelf component 52 when the shelf component 52 moves from the lowered position to the raised position. The first and second projections 110, 112 are generally parallel and form the recess 92. The stationary coupler 90 first and second projections 110, 112 can be considered as fingers which assist in preventing the shelf component 52 from being inadvertently removed from the raised position when the shelf component 52 is in the raised position, as will be more fully explained below.

As mentioned above, the projection 100 and recess 92 can each be considered as an engagement member for the purposes of the present invention. In following, in an alternative embodiment of the present invention, the support 80 can have a recess (not shown, but see the recess 92), instead of the recess 90 being in the stationary coupler 90. The stationary coupler 90 could then have a projection (not shown, but see the projection 100) for engaging with the recess in the support 80 when the shelf component 52 is in the lowered position to generally prevent the shelf component 52 from inadvertently swinging outwardly from the lowered position.

Returning to the embodiment of FIG. 5, as shown in many of the other Figures, the stationary coupler 90 can have an engagement surface 114 for engaging the support 80 at a contact edge 88 and for supporting the shelf component 52 when the shelf component 52 is in the raised position (see FIG. 17). The shelf component 52 can laterally slide along the axis of rotation 56 from a first lateral position 120 to a second lateral position 122 (see FIG. 4), when the shelf component is raised above the raised position (see FIG. 16). As can be understood from viewing these and other Figures together, the stationary coupler 90 will prevent the shelf component 52 from moving into the second lateral position 122 due to the support 80 coming into contact with the coupler 90, unless the shelf component 52 is raised above the raised position, such that the support clears the coupler 90 (see FIG. 16). Once the support 80 clears the coupler 90, the shelf component can be laterally slid into the second lateral position 122 from the first lateral position 120. Once the shelf component 52 is in the second lateral position 122, the shelf component 52 can be lowered into the raised position with the contact edge 88 contacting the engagement edge 114 (see FIG. 17). When a user wishes to place the shelf component 52 in the lowered position (see FIG. 14), the shelf component 52 must be moved from the second lateral position 122 into the first lateral position 120. In order to place the shelf component 52 into the first lateral position 120, the shelf component 52 must be raised such that the support 80 clears the first and second projections or fingers 110, 112. The shelf component 52 can then be slid from the second lateral position 122 to the first lateral position 120, and then lowered into the lowered position (see FIG. 14).

Figure 13:
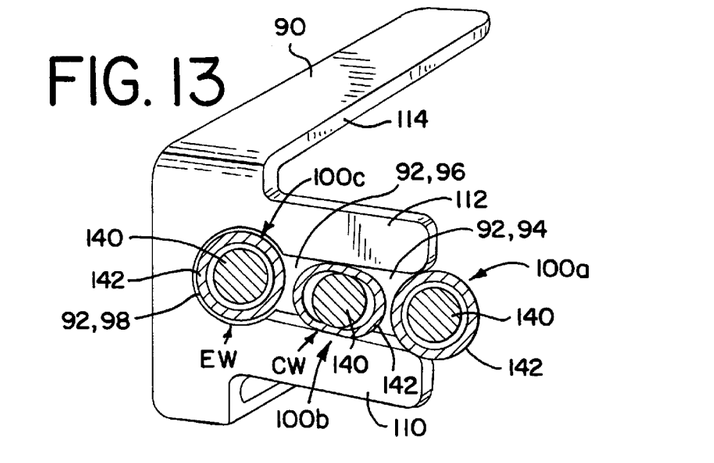
FIG. 13 is a perspective view of the stationary coupler of the embodiment of the shelf assembly shown in FIG. 5.

Another aspect of the present invention is shown in FIG. 13. In particular, FIG. 13 shows that the projection 100 has several elements. In particular, the projection 100 includes a ridged inner core 140 and a flexible outer dowel 142. The dowel 142 can be made of a plastic or rubber material. The material used should be flexible enough to bend through the recess 92, but rigid enough to prevent inadvertent removal of the shelf component 52 from the lowered position. The material of the dowel 142 should also not have a coefficient of friction greater than that which would allow the dowel 142 easily move through the recess 92.

Figure 7:
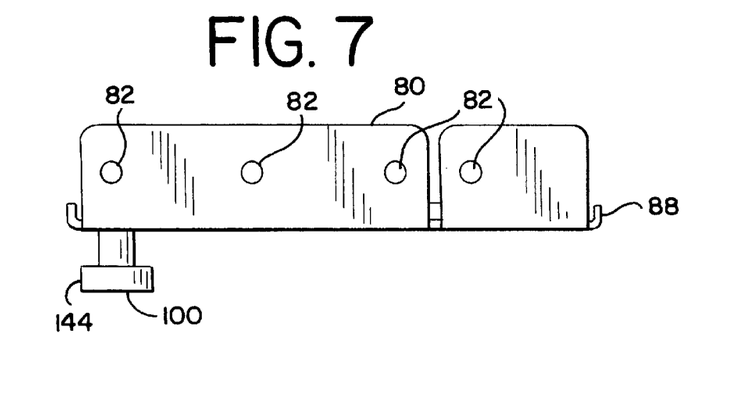
FIG. 7 is a bottom view of the support shown in FIG. 6.
Figure 8:
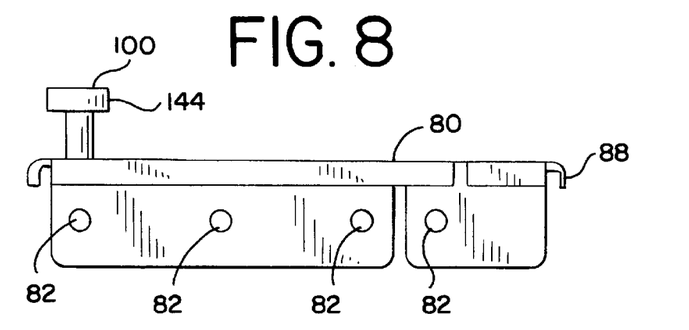
FIG. 8 is a top view of the support shown in FIG. 6.
Figure 9:
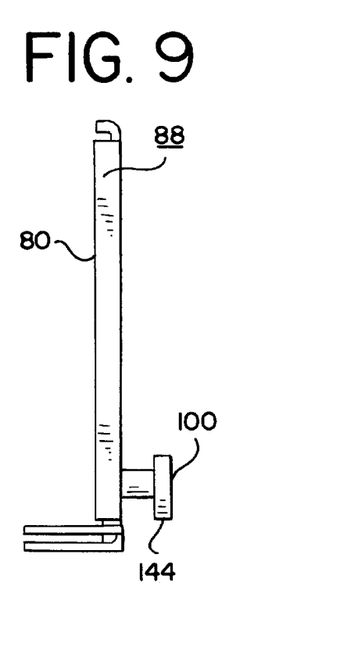
FIG. 9 is a right side view of the support shown in FIG. 6.
Figure 10:
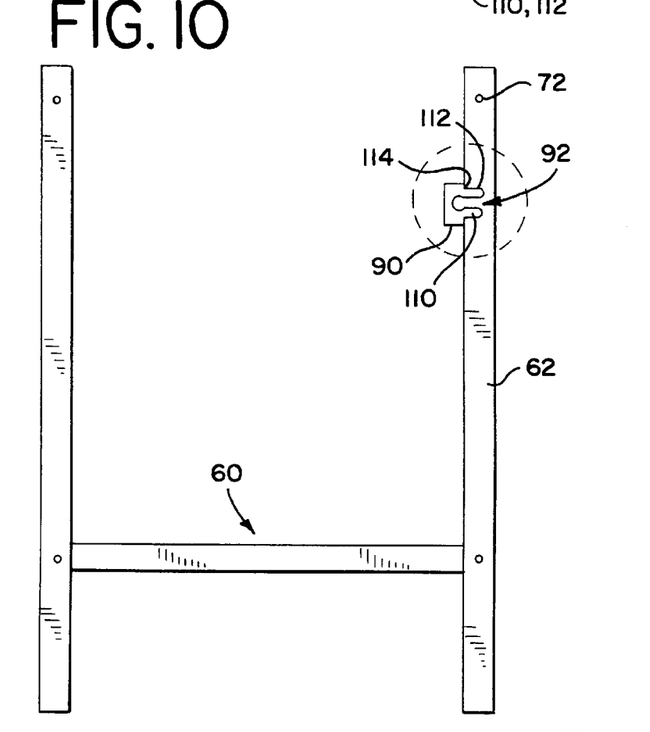
FIG. 10 is a front view of a portion of one frame of the embodiment of the shelf assembly shown in FIG. 5.

The projection 100 also has a retaining ledge 144 (see FIGS. 7 8, and 9). The dowel 142 is held between the retaining ledge 144 and the main portion of the support 80. As shown in FIG. 13 with reference numbers 100a, 100b, and 100c, when the projection 100a begins to enter the entrance region 94 of the recess 92, the dowel 142 contacts the first and second projections 110, 112. As the dowel and projection 100b moves into the central region 96 of the recess 92, the dowel is squeezed to a deformed state by the first and second projections 110, 112, and the dowel 142 may also come into contact with the core 140 of the projection 100b. When the shelf component 52 is placed within the final lowered position, the projection (pin) 100c moves into an engagement region 98 of the recess 92. The dowel 142 then expands to a non-deformed state, and assists in preventing the shelf component from moving out of the lowered position by resistance to deformation.

Figures 14, 15:
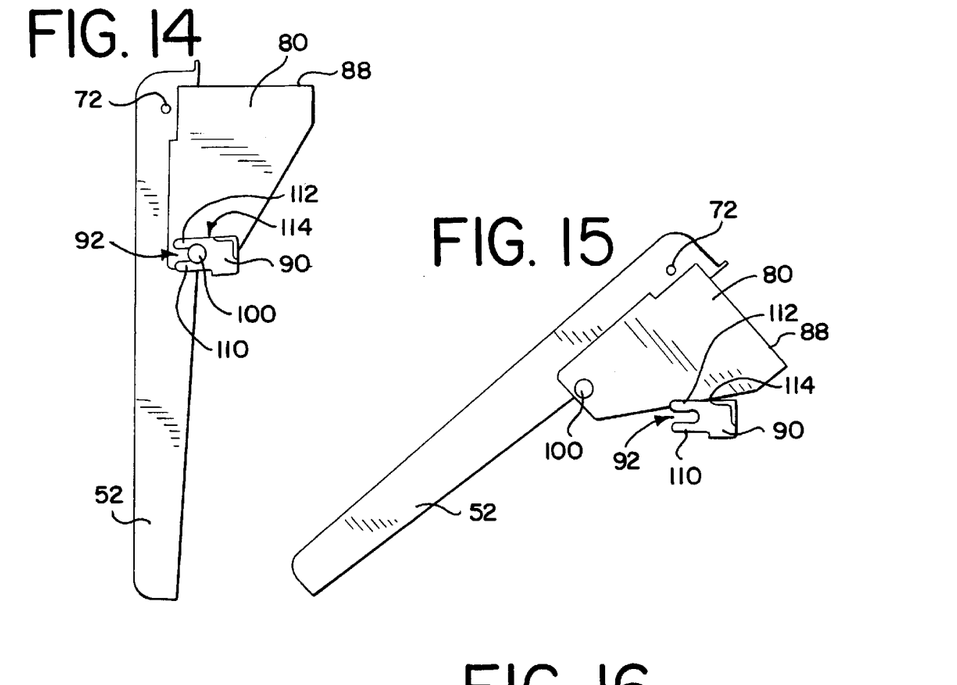
FIG. 14 is a side view of a part of the embodiment of the shelf assembly shown in FIG. 5, with the shelf component in the lowered position.
FIG. 15 is a side view of a part of the embodiment of the shelf assembly shown in FIG. 5, with the shelf component being raised toward the raised position, or being lowered toward the lowered position.
Figure 16:
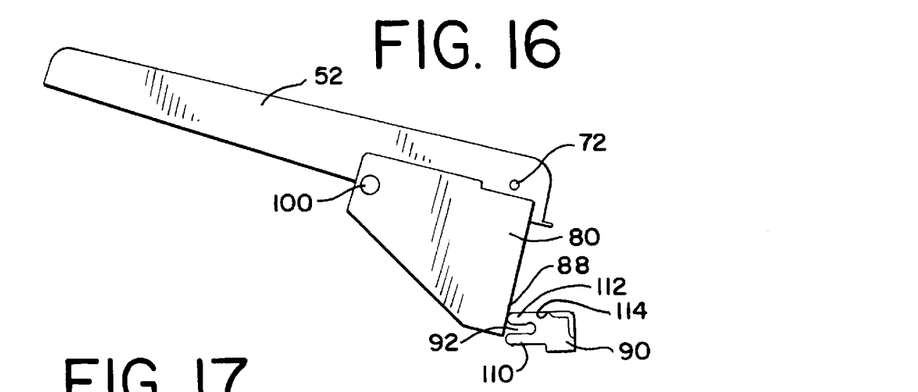
FIG. 16 is a side view of a part of the embodiment of the shelf assembly shown in FIG. 5, with the shelf component in a position just before being placed in the raised position, or just after being taken out of the raised position.

As was described above, FIG. 14 shows the shelf component 52 of the embodiment in FIG. 5, in the lowered position, with the projection 100 engaged with the recess 92. The shelf component 52 in FIG. 14 is in the first lateral position 120. FIG. 15 shows this shelf component 52 either being moved out of the lowered position and into the raised position, or vice versa. The shelf component 52 in FIG. 15 is also in the first lateral position 120. FIG. 16 shows this shelf component 52 either just before being placed in the raised position, or just after being taken out of the raised position. This shelf component 52 in FIG. 16 can be either be in the first lateral position 120 or the second lateral position 122. The shelf component 52 in FIG. 17 is in the raised position.

As can be understood from the above description, and in particular from FIGS. 4, 14, 15, 16, and 17, the present invention further provides a method of placing the shelf component 52 in a raised position from a lowered position. The method includes rotating the shelf component 52 about the axis of rotation 56 from the lowered position in a direction toward the raised position. The method further includes raising the shelf component 52 above the raised position in order to clear a blocking component, such as one of the fingers 110, 112. The method also includes sliding the shelf component 52 laterally along the axis of rotation 56 from a first lateral position 120 to a second lateral position 122. The shelf component 52 can then be lowered into the raised position. As mentioned above, the blocking component can be the stationary coupler 90, or a portion thereof.

Figure 18:
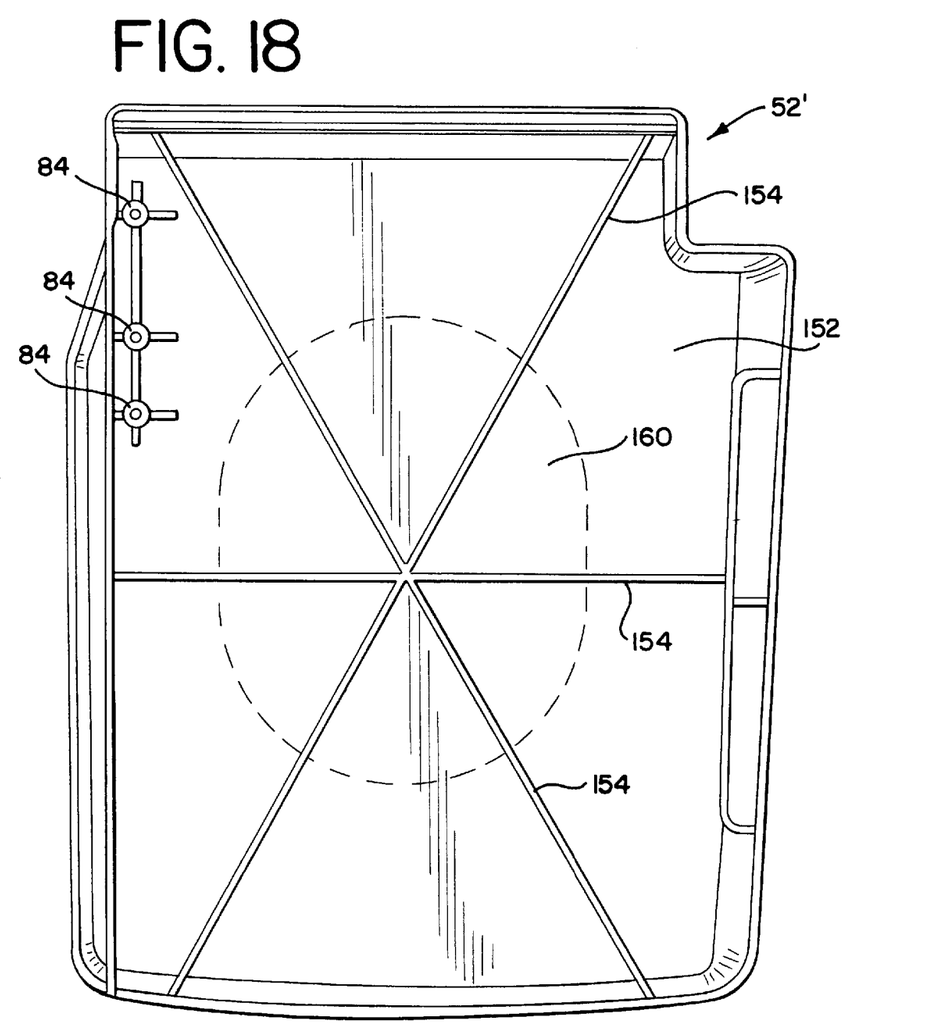
FIG. 18 is a bottom view of one embodiment of the shelf component of the present invention.
Figure 19:
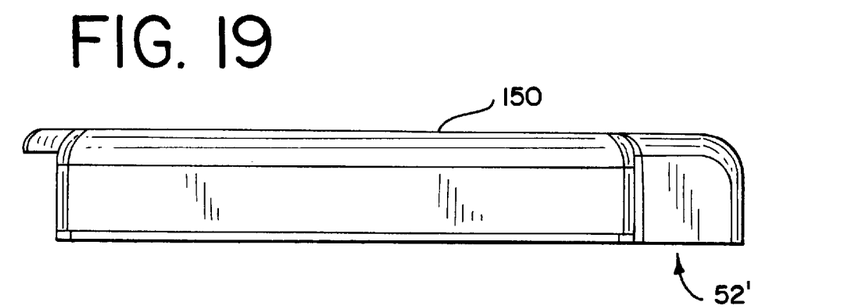
FIG. 19 is a front view of the embodiment of the shelf component shown in FIG. 18.

FIGS. 18 through 21 depict various alternative embodiments of the shelf component 52 of the present invention. FIGS. 18 and 19 show the shelf component 52' having an upper surface 150 and a lower surface 152 generally parallel with the upper surface 150. The shelf component 52' has a plurality of ribs 154 extending substantially across the lower surface 152 of the shelf component 52' to increase the rigidity of the shelf component 52'. Some of the ribs 154 shown in FIG. 18 extend across a central region 160 of the lower surface 152. The shelf components 52, 52', 52", 52'" can be made of a plastic material. The ribs 154 can be crossed as shown in FIG. 18, or not crossed as shown with some of the ribs 158, 160 in FIG. 20. The ribs 154 can also be parallel to one another. When an object (not shown) is placed on the shelf component 52, 52', 52", 52'" in the raised position, a gravitational force is transferred from the upper surface 150 of the shelf component 52 through the plurality of ribs 154, to the support 80 and to the stationary coupler 90, in order to support the object.

While specific embodiments have been illustrated and described, numerous modifications are possible without departing from the spirit of the invention, and the scope of protection is only limited by the scope of the accompanying claims.

We claim:

1. A shelf assembly for a barbeque grill having a frame member, the shelf assembly comprising:

a shelf component having a first end, and being capable of rotating about a generally horizontal axis of rotation located generally at the first end, the shelf component further being capable of rotating about the axis of rotation outwardly from a lowered position to a raised position, wherein the frame member supports the first end of the shelf component about the axis of rotation;

a support extending downwardly in relation to the shelf component when the shelf component is in the raised position, wherein the support is capable of rotating about the axis of rotation with the shelf component; and, a stationary coupler located generally below the axis of rotation in the vicinity of where the support is capable of rotating about the axis of rotation with the shelf component, wherein the support releasably engages with the stationary coupler when the shelf component is in the lowered position to generally prevent the shelf component from inadvertently rotating about the axis of rotation from the lowered position toward said raised position.

2. The shelf assembly of claim 1, wherein the support supportingly engages with the stationary coupler to support the support and the shelf component when the shelf component is in the raised position.

3. The shelf assembly of claim 2, wherein the stationary coupler comprises:

a recess for releasably engaging with the support when the shelf component is in the lowered position to generally prevent the shelf component from inadvertently swinging outwardly from the lowered position.

4. The shelf assembly of claim 3, wherein the recess comprises:

an entrance region;

a central region adjacent to the entrance region, the central region having a central width; and, an engagement region adjacent to the central region, the engagement region having an engagement width that is wider than the central width.

5. The shelf assembly of claim 2, wherein the stationary coupler comprises:

a first projection facing generally in a direction of an outward movement of the shelf component when the shelf component moves from the lowered position to the raised position;

a second projection facing generally in the direction of the outward movement of the shelf component when the shelf component moves from the lowered position to the raised position, the second projection being generally parallel to the first projection, the first and second projections forming a recess for engaging with the support.

6. The shelf assembly of claim 5, wherein the support comprises:

a projection for engaging with the recess in the stationary coupler when the shelf component is in the lowered position to generally prevent the shelf component from inadvertently swinging outwardly from the lowered position.

7. The shelf assembly of claim 2, wherein the support comprises:

an engagement member for engaging with the stationary coupler when the shelf component is in the lowered position.

8. The shelf assembly of claim 2, wherein the support comprises:

a recess for engaging with the stationary coupler when the shelf component is in the lowered position.

9. The shelf assembly of claim 2, wherein the stationary coupler comprises:

a projection for engaging with the recess in the support when the shelf component is in the lowered position, engagement of said projection and recess adapted to generally prevent the shelf component from inadvertently swinging outwardly from the lowered position.

10. The shelf assembly of claim 2, wherein the stationary coupler comprises:

an engagement surface for engaging the support and for supporting the shelf component when the shelf component is in the raised position.

11. The shelf assembly of claim 2, wherein the stationary coupler comprises:

means for preventing the shelf component from being inadvertently removed from the raised position when the shelf component is in the raised position.

12. The shelf assembly of claim 11, wherein the stationary coupler comprises:

at least one finger for preventing the shelf component from being inadvertently removed from the raised position when the shelf component is in the raised position.

13. The shelf assembly of claim 2, wherein the shelf component is adapted to laterally slide along the axis of rotation from a first lateral position to a second lateral position, when the shelf component is raised above the raised position.

14. The shelf assembly of claim 13, wherein the shelf component is prevented from being placed in the lowered position when the shelf component is in the second lateral position.

15. The shelf assembly of claim 13, wherein when the shelf component can only be placed in the lowered position when the shelf component is in the first lateral position.

16. The shelf assembly of claim 2, further comprising:

a rod aligned with the axis of rotation, wherein the shelf component rotates about the rod, and wherein the rod connects with the frame member for supporting the first end of the shelf component about the rod.

17. The shelf assembly of claim 1, wherein the assembly includes a frame member having a leg which supports a first side of the first end of the shelf component about the axis of rotation.

18. The shelf assembly of claim 17 wherein the frame member further comprises:

an arm which supports a second side of the first end of the shelf component about the axis of rotation.

19. The shelf assembly of claim 1, wherein said assembly includes a frame member leg and wherein the stationary coupler is mounted on the leg.

20. A shelf assembly for a barbeque grill, the shelf assembly comprising:

a shelf component having a first end, and being capable of rotating about a generally horizontal axis of rotation located generally at the first end, the shelf component further being capable of rotating about the axis of rotation from a lowered position to a raised position;

at least one frame member for supporting the first end of the shelf component about the axis of rotation;

a support extending downwardly in relation to the shelf component when the shelf component is in the raised position, wherein the support is capable of rotating about the axis of rotation with the shelf component, and said support is adapted to laterally move from a first position to an adjacent second position toward a stationary coupler located generally below the axis of rotation, wherein the support supportingly engages with the stationary coupler to support the support and the shelf component when the shelf component is in the raised position.

21. The shelf assembly of claim 20, wherein the shelf component comprises:

an upper surface;

a lower surface generally parallel with the upper surface, wherein at least one rib extends substantially across the lower surface of the shelf component to increase the rigidity of the shelf component.

22. The shelf assembly of claim 21, wherein the at least one rib extends from a position adjacent the support to a position generally across a central region of the lower surface of the shelf component.

23. The shelf assembly of claim 20, wherein the shelf component comprises:

an upper surface;

a lower surface generally parallel with the upper surface, a plurality of ribs extending substantially across the lower surface of the shelf component to increase the rigidity of the shelf component.

24. The shelf assembly of claim 23, wherein when the support is engaged with the stationary coupler, a gravitational force is transferred from the upper surface of the shelf component through the plurality of ribs, to the support and to the stationary coupler, to support any objects that are placed on the upper surface of the shelf component.

25. The shelf assembly of claim 23, wherein two of the plurality of ribs extend from a position adjacent the support to a position generally across a central region of the lower surface of the shelf component.

26. The shelf assembly of claim 25, wherein the two ribs are crossed.

27. The shelf assembly of claim 25, wherein the two ribs are not crossed.

28. The shelf assembly of claim 25, wherein the two ribs are parallel.

29. A shelf assembly for a barbeque grill, the shelf assembly comprising:

a shelf component having a first end, and being capable of rotating about a generally horizontal axis of rotation located generally at the first end, the shelf component further being capable of rotating about the axis of rotation from a lowered position to a raised position, wherein the shelf component is adapted to laterally slide along the axis of rotation from a first lateral position to a second lateral position, when the shelf component is raised at least to a level of the raised position;

a support extending downwardly in relation to the shelf component when the shelf component is in the raised position, wherein the support is capable of rotating about the axis of rotation with the shelf component; and, a stationary coupler located generally below the axis of rotation in the vicinity of where the support is capable of rotating about the axis of rotation with the shelf component, wherein the support supportingly engages with the stationary coupler to support the support and the shelf component when the shelf component is placed in the raised position from the lowered position by raising the shelf component above the raised position, by sliding the shelf component from the first lateral position to the second lateral position, and by lowering the shelf component into the second lateral position.

30. A method of placing a shelf assembly, for a cooking apparatus, in a raised position from a lowered position, the method comprising the steps of:

rotating a shelf component, having a first end, about a generally horizontal axis of rotation located generally at the first end, from the lowered position in a direction toward the raised position;

raising the shelf component above the raised position in order to clear a blocking component;

sliding the shelf component laterally along the axis of rotation from a first lateral position to a second lateral position; and, lowering the shelf component into the raised position, the shelf component being fixed by the blocking component.

31. The method of claim 30, wherein the blocking component is a stationary coupler located generally below the axis of rotation in the vicinity of where a support, connected to the shelf component, is capable of rotating about the axis of rotation with the shelf component.

32. The method of claim 31, further wherein the support supportingly engages with the stationary coupler to support the support and the shelf component when the shelf component is placed in the raised position from the lowered position by raising the shelf component above the raised position, by sliding the shelf component from the first lateral position to the second lateral position, and by lowering the shelf component into the second lateral position.

33. A shelf assembly for a barbeque grill, the shelf assembly comprising:

a shelf component having a first end and adapted to rotate about an axis of rotation generally adjacent said first end, said rotation of the shelf including a lowered position and upward to a raised substantially horizontal position, wherein the shelf component when rotated upward to at least said raised position is adapted to laterally move generally along said axis of rotation from a first position to an adjacent second position, said shelf component in said second position being secured in said raised position; and at least one cantilever support bracket depending from the shelf component, said support bracket having a support surface that is removably engaged with a blocking member to provide support of the shelf component in said raised position.

34. The shelf assembly of claim 33 wherein, the shelf component is at least partially secured in said raised position by engagement of a portion of the shelf with a blocking component positioned below at least a portion of said shelf component.

* * * * *